US008950215B2

(12) United States Patent
Rappoport et al.

(10) Patent No.: US 8,950,215 B2
(45) Date of Patent: Feb. 10, 2015

(54) NON-CONTACT POLISHING TECHNIQUES FOR REDUCING ROUGHNESS ON GLASS SURFACES

(75) Inventors: Benjamin M. Rappoport, San Francisco, CA (US); Christopher Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 531 days.

(21) Appl. No.: 13/107,907

(22) Filed: May 14, 2011

(65) Prior Publication Data
US 2012/0088067 A1 Apr. 12, 2012

Related U.S. Application Data

(60) Provisional application No. 61/390,582, filed on Oct. 6, 2010.

(51) Int. Cl.
*C03C 23/00* (2006.01)
*G09B 5/08* (2006.01)
*C03C 21/00* (2006.01)
*H04L 12/24* (2006.01)

(52) U.S. Cl.
CPC ............... *G09B 5/08* (2013.01); *C03C 21/002* (2013.01); *C03C 23/006* (2013.01); *H04L 41/509* (2013.01); *C03C 2218/32* (2013.01)
USPC ............................ 65/30.14; 65/30.13; 65/30.1

(58) Field of Classification Search
USPC .......................................... 65/30.1–30.14, 65
See application file for complete search history.

(56) References Cited

U.S. PATENT DOCUMENTS

| | | | |
|---|---|---|---|
| 3,467,508 A | | 9/1969 | Loukes et al. |
| 4,263,030 A | * | 4/1981 | Kobayashi et al. ............. 65/426 |
| 4,569,119 A | * | 2/1986 | Terada et al. ................. 438/183 |
| 4,671,814 A | * | 6/1987 | Aratani et al. ............... 65/30.14 |
| 4,863,501 A | * | 9/1989 | Mansfield ....................... 65/391 |
| 4,911,743 A | * | 3/1990 | Bagby ............................... 65/31 |
| 5,129,934 A | | 7/1992 | Koss |

(Continued)

FOREIGN PATENT DOCUMENTS

| | | |
|---|---|---|
| CN | 1369449 A | 9/2002 |
| CN | 1694589 A | 11/2005 |

(Continued)

OTHER PUBLICATIONS

Desai Jainil, "Advances and Processes in Precision Glass Polishing Techiniques" Nov. 6, 2009 as viewed at http://plaza.ufl.edu/jainilndesai/project%20reports/Advances%20and%20Processes%20in%20Precision%20Glass%20Polishing%20Technique1.pdf on Oct. 25, 2013.*

(Continued)

*Primary Examiner* — Jodi C Franklin (57) ABSTRACT

Apparatus, systems and methods for reducing surface roughness on surface of a glass member using a non-contact polishing process are disclosed. According to one aspect, a method for processing a glass member suitable for use in a handheld electronic device includes obtaining the glass member and chemically strengthening the glass member. The glass member has at least one surface, and chemically strengthening the glass member increases roughness associated with the at least one surface. The method also includes applying a first non-contact polishing process to the glass member after chemically strengthening the glass member. Applying the first non-contact polishing process reduces the roughness associated with the at least one surface.

22 Claims, 7 Drawing Sheets

(56) References Cited

U.S. PATENT DOCUMENTS

| | | | |
|---|---|---|---|
| 5,374,291 A * | 12/1994 | Yabe et al. | 65/30.11 |
| 5,483,261 A | 1/1996 | Yasutake | |
| 5,488,204 A | 1/1996 | Mead et al. | |
| 5,766,493 A | 6/1998 | Shin | |
| 5,816,225 A | 10/1998 | Koch et al. | |
| 5,825,352 A | 10/1998 | Bisset et al. | |
| 5,835,079 A | 11/1998 | Shieh | |
| 5,880,411 A | 3/1999 | Gillespie et al. | |
| 6,166,915 A | 12/2000 | Lake et al. | |
| 6,188,391 B1 | 2/2001 | Seely et al. | |
| 6,307,590 B1 | 10/2001 | Yoshida | |
| 6,310,610 B1 | 10/2001 | Beaton et al. | |
| 6,323,846 B1 | 11/2001 | Westerman et al. | |
| 6,327,011 B2 | 12/2001 | Kim | |
| 6,350,664 B1 | 2/2002 | Haji et al. | |
| 6,437,867 B2 | 8/2002 | Zeylikovich et al. | |
| 6,523,367 B1 * | 2/2003 | Ikeda et al. | 65/30.1 |
| 6,690,387 B2 | 2/2004 | Zimmerman et al. | |
| 6,955,971 B2 | 10/2005 | Ghyselen et al. | |
| 7,012,700 B2 | 3/2006 | De Groot et al. | |
| 7,015,894 B2 | 3/2006 | Morohoshi | |
| 7,028,508 B2 * | 4/2006 | Fabian et al. | 65/414 |
| 7,184,064 B2 | 2/2007 | Zimmerman et al. | |
| 7,663,607 B2 | 2/2010 | Hotelling et al. | |
| 7,918,019 B2 | 4/2011 | Chang et al. | |
| 2001/0039810 A1 * | 11/2001 | Eda et al. | 65/30.14 |
| 2003/0057183 A1 | 3/2003 | Cho et al. | |
| 2003/0110803 A1 * | 6/2003 | Saito et al. | 65/30.14 |
| 2003/0186622 A1 * | 10/2003 | Kimura et al. | 451/6 |
| 2003/0192348 A1 * | 10/2003 | Kudoh et al. | 65/30.14 |
| 2004/0142118 A1 | 7/2004 | Takechi | |
| 2005/0245165 A1 | 11/2005 | Harada et al. | |
| 2006/0026521 A1 | 2/2006 | Hotelling et al. | |
| 2006/0055936 A1 | 3/2006 | Yun et al. | |
| 2006/0097991 A1 | 5/2006 | Hotelling et al. | |
| 2006/0197753 A1 | 9/2006 | Hotelling et al. | |
| 2006/0250559 A1 | 11/2006 | Bocko et al. | |
| 2006/0292822 A1 | 12/2006 | Xie | |
| 2007/0196578 A1 | 8/2007 | Karp et al. | |
| 2008/0026260 A1 * | 1/2008 | Kawai | 428/846.9 |
| 2008/0135175 A1 | 6/2008 | Higuchi | |
| 2008/0261057 A1 | 10/2008 | Slobodin | |
| 2008/0286548 A1 | 11/2008 | Ellison et al. | |
| 2009/0091551 A1 | 4/2009 | Hotelling et al. | |
| 2009/0252993 A1 * | 10/2009 | Kawai et al. | 428/846.9 |
| 2010/0053632 A1 | 3/2010 | Alphonse et al. | |
| 2010/0062284 A1 * | 3/2010 | Watanabe et al. | 428/800 |
| 2010/0119846 A1 * | 5/2010 | Sawada | 428/426 |
| 2010/0167059 A1 * | 7/2010 | Hashimoto et al. | 428/410 |
| 2010/0171920 A1 * | 7/2010 | Nishiyama | 349/158 |
| 2011/0030209 A1 | 2/2011 | Chang et al. | |
| 2011/0255000 A1 | 10/2011 | Weber et al. | |
| 2012/0099113 A1 | 4/2012 | de Boer et al. | |
| 2013/0182259 A1 | 7/2013 | Brezinski et al. | |

FOREIGN PATENT DOCUMENTS

| | | |
|---|---|---|
| CN | 101025502 | 8/2007 |
| CN | 101206314 | 6/2008 |
| CN | 102131357 | 7/2011 |
| EP | 1592073 | 11/2005 |
| EP | 2483216 | 8/2012 |
| JP | S48-006925 | 3/1973 |
| JP | 05249422 | 9/1993 |
| JP | 52-031757 | 3/1997 |
| JP | 52031757 | 3/1997 |
| JP | 09-312245 | 12/1997 |
| JP | 2000-163031 | 6/2000 |
| JP | 200203895 A | 7/2000 |
| JP | 2002-342033 | 11/2002 |
| WO | WO 2009/003029 | 12/2008 |
| WO | WO 2010/080988 | 7/2010 |
| WO | WO 2011/041484 A1 | 4/2011 |
| WO | WO 2013/106242 A2 | 7/2013 |

OTHER PUBLICATIONS

Zhang, Jufan. "Application of atmospheric pressure plasma polishing method in machining of silicon ultra-smooth surfaces" translated from Optics and Precision Engineering 2007 as viewed at http://download.springer.com/static/pdf/249/art%253A10.1007%252Fs11460-008-0072-9.pdf?auth66=1382812174_bd1dedb0f9b175fe7f88bb7da021e4f3&ext=.pdf on Oct. 25, 2013.*

Ohkuma, "Development of a Manufacturing Process of a Thin, Lightweight LCD Cell", Department of Cell Process Development, IBM, Japan, Section 13.4.

Lee et al., "A Multi-Touch Three Dimensional Touch-Sensitive Tablet", Proceedings of CHI: ACM Conference on Human Factors in Computing Systems, Apr. 1985, pp. 21-25.

Rubin, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.

Rubin, "Combining Gestures and Direct Manipulation", CHI'92, May 1992, pp. 659-660.

Westerman, "Hand Tracking, Finger Identification and Chordic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.

* cited by examiner

NON-CONTACT POLISHING TECHNIQUES FOR REDUCING ROUGHNESS ON GLASS SURFACES

CROSS-REFERENCE TO RELATED APPLICATION

This application claim priority to U.S. Provisional Patent Application No. 61/390,582, filed Oct. 6, 2010, entitled "NON-CONTACT POLISHING TECHNIQUES FOR REDUCING ROUGHNESS ON GLASS SURFACES" and incorporated herein by reference for all purposes.

FIELD OF THE INVENTION

The present disclosure relates generally to glass forming processes and, more particularly, to using plasma polishing processes to reduce roughness on glass surfaces.

BACKGROUND OF THE INVENTION

Glass parts, e.g., glass covers and/or displays, are often used in handheld electronic devices. Providing a reasonable level of strength in the glass parts is crucial to reduce the likelihood of failure in the glass parts. As handheld electronic devices are often subject to being dropped or otherwise mishandled, reducing the likelihood of glass parts breaking after being dropped or mishandled is desirable. To this end, glass parts are often chemically treated to increase the strength of the glass parts. Chemically strengthening of the glass parts, however, typically significantly increases the surface roughness of the glass parts.

To reduce the surface roughness of glass parts after chemical strengthening, mechanical polishing processes are often used to smooth the surfaces of the glass parts. Mechanical polishing processes used to reduce surface roughness after chemical strengthening generally remove a significant amount of material from the surfaces of the glass parts. The removal of a significant amount of material from the surfaces of the glass parts to reduce roughness may have an adverse effect on the strength of the glass parts. A chemical strengthening process induces compressive stress on the surface of a glass part, and the compressive stress decreases towards the center of the glass part. As the amount of material removed after the chemical strengthening process increases, the compressive stress at the surface of the glass part decreases.

Therefore, what is needed is a method and an apparatus for reducing surface roughness on glass parts without significantly compromising the strength of the glass parts. That is, what is desired is a method and an apparatus for reducing surface roughness on glass parts without removing a significant amount of material from the glass parts.

SUMMARY

The invention pertains to apparatus, systems and methods for using non-contact polishing methods to polish glass pieces.

The apparatus, systems and methods for polishing glass pieces, e.g., using plasma polishing, may be assembled in relatively small form factor electronic devices such as handheld electronic devices, as for example mobile phones, media players, user input devices (e.g., mouse, touch sensitive devices), personal digital assistants, remote controls, etc. The apparatus, systems and methods may also be used for glass pieces such as covers or displays for other relatively larger form factor electronic device including, but not limited to including, portable computers, tablet computers, displays, monitors, televisions, etc.

The invention may be implemented in numerous ways, including as a method, system, device, or apparatus (including computer readable media that embody transitory signals). Several embodiments of the invention are discussed below.

According to one aspect of the present invention, a method for processing a glass member suitable for use in a handheld electronic device includes obtaining the glass member and chemically strengthening the glass member. The glass member has at least one surface, and chemically strengthening the glass member increases roughness associated with the at least one surface. The method also includes applying a first non-contact polishing process to the glass member after chemically strengthening the glass member. Applying the first non-contact polishing process reduces the roughness associated with the at least one surface. In one embodiment, the first non-contact polishing process is an atmospheric pressure plasma polishing process.

In accordance with another aspect of the present invention, a method for processing a glass member suitable for use in a handheld electronic device includes obtaining the glass member and chemically strengthening the glass member. The method also includes determining a desired stress profile for the glass member, and applying a first non-contact polishing process to the glass member after chemically strengthening the glass member. Applying the first non-contact polishing process includes polishing selected areas of the at least one surface to achieve the desired stress profile.

In accordance with yet another aspect of the present invention, a method for processing a glass member suitable for use in a handheld electronic device includes obtaining the glass member that has at least one surface, and chemically strengthening the glass member. Chemically strengthening the glass member increases roughness associated with the at least one surface, the at least one surface including a first defect having a first geometry. Finally, the method also includes applying a first non-contact polishing process to the glass member after chemically strengthening the glass member, wherein applying the first non-contact polishing process smoothes the first geometry.

According to still another aspect of the present invention, a glass member suitable for use in a handheld electronic device includes a first polished area and a second area. The first area is chemically strengthened, and is polished using a first plasma polishing process after being chemically strengthened. The first area has a first level of surface roughness and the second area has a second level of surface roughness.

The present invention provides other embodiments configured to implement the aspects of the invention, as well as software (or computer program code) stored in a computer-readable or machine-readable medium (e.g., a tangible storage medium) to control devices to perform these methods.

Other aspects and advantages of the invention will become apparent from the following detailed description taken in conjunction with the accompanying drawings which illustrate, by way of example, the principles of the invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations associated with the specification.

DETAILED DESCRIPTION OF EMBODIMENTS OF THE INVENTION

The invention pertains to apparatus, systems and methods for polishing surfaces of glass members. The use of non-contact polishing methods, e.g., plasma polishing methods, allows for roughness on the surfaces of glass to be reduced while providing for relatively minimal removal of material from the surfaces. Plasma polishing methods may generally be used after a chemical strengthening process and/or may replace polishing processes which typically occur prior to the chemical strengthening process.

The apparatus, systems, and methods of the present invention allow for the formation of glass parts such as glass members that are suitable for glass covers assembled in small form factor electronic devices, such as handheld electronic devices, as for example mobile phones, media players, user input devices (e.g., mouse, touch sensitive devices), personal digital assistants, remote controls, etc. The apparatus, systems, and methods may also be used for glass covers or displays for other relatively larger form factor electronic devices such as portable computers, tablet computers, displays, monitors, televisions, etc.

Embodiments are described herein in the context of implementing a non-contact polishing process, e.g., a plasma polishing process. The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In one embodiment, a non-contact polishing process such as a plasma polishing process is used to modify the surfaces of glass members. Modifying the surface of a glass member may facilitate the application of anti-reflective coatings, facilitate the application of anti-smudge coatings, improve adhesion to the surface, and support improved lamination.

A plasma polishing process may be used on a glass member after a chemical strengthening process to reduce surface roughness. The use of a plasma polishing process allows for less material to be removed, while reducing surface roughness, than would be removed using a mechanical polishing process. It should be appreciated, however, that a plasma polishing process is not limited to being used to reduce surface roughness after chemical strengthening. For example, plasma polishing may also be performed prior to chemical strengthening.

A plasma polishing process may be used selectively. For example, a plasma polishing process may be applied to reduce roughness on some surfaces of a glass part, while other surfaces may of the glass part may remain substantially unpolished. Thus, material may be removed from some surfaces but not from others. Alternatively, a plasma polishing process may be applied to selected areas on a particular surface of a glass part, but not to other areas on the particular surface. Providing different amounts of plasma polishing on different areas of a surface of a glass part may allow a desired stress profile to be created in the glass part. In other words, the use of a plasma polishing process to provide different amounts of polishing to different areas of a surface effectively allows the stress profile in a glass part to be controlled.

A plasma polishing process may generally improve the strength of glass substantially without contacting the surface of the glass and, thus, the potential for damaging the glass as a result of polishing may be reduced. In one embodiment, a lower or reduced microscopic surface roughness may result from a plasma polishing process. In another embodiment, although microscopic surface roughness may not be reduced significantly, the geometry of rough surfaces may be substantially smoothed using a plasma polishing process. The smoothing of microscopic features reduces the likelihood that the glass may fail, as the geometry of defects in the glass has an effect on the strength of the glass. By way of example, when defects are present in the glass where stress is applied, defects that have a relatively smooth geometry provide for a higher glass strength than provided for by defects that have a less smooth, or relatively sharp, geometry.

Figure 1:
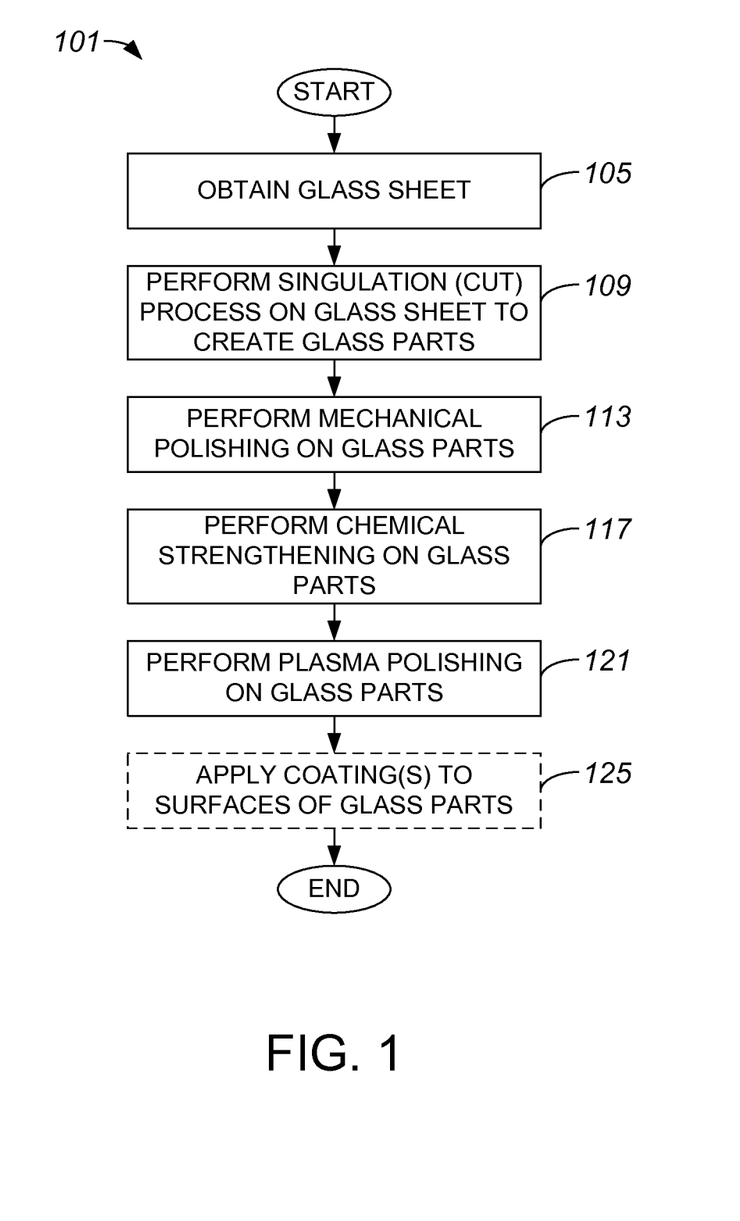
FIG. 1 is a process flow diagram which illustrates one method of processing glass to improve the strength of the glass piece in accordance with an embodiment of the present invention.

Referring initially to FIG. 1, one method of processing glass to improve the strength of the glass piece will be described in accordance with an embodiment of the present invention. A method 101 of processing glass begins at step 105 in which a glass sheet is obtained. A glass sheet may generally be of any size and/or composition. By way of example, a glass sheet may be formed from aluminosilicate or soda lime glass. It should be appreciated, however, that a glass sheet is not limited to being aluminosilicate glass or soda lime glass.

After the glass sheet is obtained, a singulation process is performed in step 109 to create glass parts from the glass sheet. That is, the glass sheet is cut into glass parts or members. Once the glass parts are obtained from the glass sheet, mechanical polishing is performed on the glass parts in step 113. Mechanical polishing may involve a chemical mechanical polishing (CMP) process which, as will be appreciated by those skilled in the art, includes introducing a slurry of solids, e.g., Cerium Oxide solids, that are intended to abrade the surfaces of the glass parts. The mechanical polishing typically includes a rough polish and a fine polish. The rough polish provides an appropriate flatness to the surfaces of the glass parts, while the fine polish generally removes imperfections from the surfaces of the glass parts that may remain after the rough polish.

Generally, the surfaces of the glass parts that are subject to mechanical polishing may vary. Any and all surfaces for the glass parts may be polished. In one embodiment, substantially only the edges of the glass parts may be polished.

In step 117, chemical strengthening is performed on the glass parts. As will be appreciated by those skilled in the art, chemical strengthening generally involves an ion-exchange process that strengthens the glass parts. The glass parts are strengthened by the creation of compression layers on the surfaces of the glass arts. To improve the strength of the glass parts, a relatively high compressive stress is desired on the surfaces of the glass parts.

The chemical strengthening of glass parts typically leads to an increase in the roughness of the surfaces, e.g., defects in the surfaces, of the glass parts. For example, a glass part with between approximately 0.32 micrometers ($\mu$m) to approximately 0.4 $\mu$m of surface roughness prior to a chemical strengthening process may have between approximately 0.9 $\mu$m to 1.2 $\mu$m of surface roughness after the chemical strengthening process.

Once the glass parts are strengthened, process flow proceeds to step 121 in which non-contact polishing, e.g., plasma polishing, is performed on the glass parts. Plasma polishing typically reduces the roughness of surfaces of the glass parts by removing material from the surfaces. The amount of material removed from the surfaces of the glass parts through plasma polishing may be less than approximately five $\mu$m or, more preferably, less than approximately one $\mu$m Plasma polishing generally enables surface roughness to be reduced while removing less material than would be removed through the use of a mechanical polishing process to reduce surface roughness, and/or to substantially smooth out rough spots in the surfaces of the glass parts.

Plasma polishing may be used to treat substantially all surfaces of the glass parts, selected surfaces of the glass parts, or portions of the surfaces of the glass parts, as will be described below with reference to FIGS. 3A and 3B. Any suitable plasma polishing process may be used to polish the surfaces of the glass parts. Suitable plasma polishing processes include, but are not limited to including, atmospheric pressure plasma polishing (APPP), reactive atom plasma polishing, plasma chemical vaporization machining polishing, and plasma ion etching. In one embodiment, a plasma polishing process may utilize a tangential plasma field that enables relatively uniform treatment of a relatively wide flat surface. One APPP process will be described below with respect to FIG. 5.

Plasma polishing generally involves the application of plasma, or a gas that has been heated or excited such that electrons begin to dissociate from atoms. Ions in the plasma generally react with silicon molecules at the surfaces of the glass parts to effectively remove the silicon molecules from the glass. The molecules formed by the reaction of ions in the plasma to silicon molecules at the surfaces of the glass may be passively dispersed into the surrounding environment.

After plasma polishing is performed on the glass parts, coatings may optionally be applied to the surfaces of the glass parts in step 125. Coatings may include, but are not limited to including, ink coatings, anti-reflective coatings, and/or anti-smudge coatings. Once coatings are applied, the method of processing glass is completed.

Figure 2:
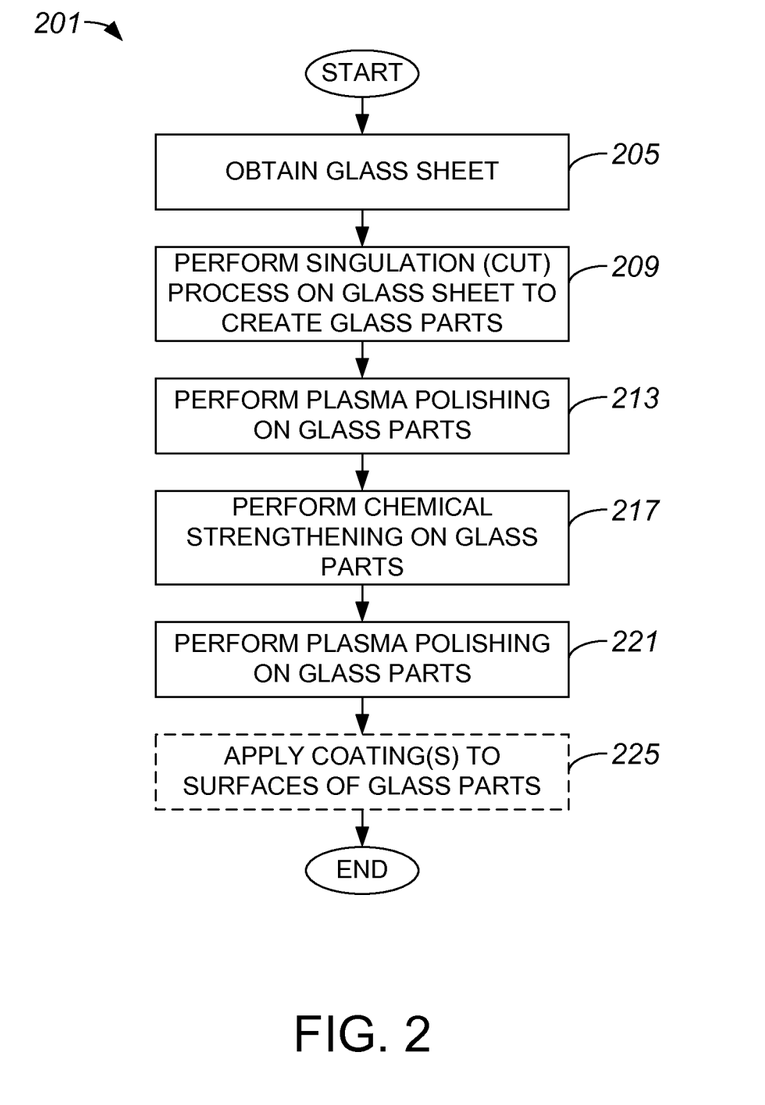
FIG. 2 is a process flow diagram which illustrates another method of processing glass to improve the strength of the glass piece in accordance with an embodiment of the present invention.

Although plasma polishing has been described as being used after a chemical strengthening process, plasma polishing may also be used before a chemical strengthening process. For example, plasma polishing may replace the rough mechanical polishing and/or the fine mechanical polishing that often occurs before chemical strengthening is performed. As mechanical polishing typically uses slurries, and slurries include particles that may cause imperfections in surfaces of glass, avoiding the use of mechanical polishing may be desirable. FIG. 2 is a process flow diagram which illustrates a method of processing glass to improve the strength of the glass piece that includes using plasma polishing prior to performing chemical strengthening in accordance with an embodiment of the present invention. A method 201 of processing glass begins at step 205 in which a glass sheet is obtained. Once the glass sheet is obtained, a singulation process is performed in step 209 to create glass parts from the glass sheet.

Upon creating glass parts from the glass sheet, plasma polishing is performed on the glass parts in step 213. The plasma polishing may include a single polishing process. Alternatively, the plasma polishing may include more than one polishing process. For example, a first plasma polishing process may be arranged to effectively provide coarse polishing while a second plasma polishing process may be arranged to effectively provide fine polishing. The first and second plasma polishing processes may utilize different chemistries, i.e., the composition of the plasma used in each process may be different. In one embodiment, a plasma polishing process may involve the use of a tangential plasma field.

After plasma polishing is performed on the glass parts, chemical strengthening is performed on the glass parts in step 217. Once the glass parts are strengthened, process flow proceeds to step 221 in which non-contact polishing, e.g., plasma polishing, is performed on the glass parts to reduce the roughness of the surfaces of the glass parts. Plasma polishing may be used to treat substantially all surfaces of the glass parts, selected surfaces of the glass parts, or portions of the surfaces of the glass parts, as will be described below with reference to FIGS. 3A and 3B. As previously mentioned, any suitable plasma polishing process may generally be used to polish the surfaces of the glass parts.

Coatings may optionally be applied to the surfaces of the glass parts in step 225. Coatings may include, but are not limited to including, ink coatings, anti-reflective coatings, and/or anti-smudge coatings. Once coatings are applied, the method of processing glass is completed.

Plasma polishing may generally be selectively applied to surfaces of a glass part. For example, plasma polishing may be applied to certain areas of a surface of a glass part but not to other areas of the surface. It should be appreciated that, in general, plasma polishing may be applied such that a greater degree of plasma polishing is applied in some areas of a surface of a glass part than in other areas. That is, selective treatment of areas of a glass surface using plasma polishing may be implemented such that certain areas are exposed to more plasma polishing than other areas. Alternatively, plasma polishing may be applied to some surfaces of a glass part but not to other surfaces. It should be appreciated that selectively applying plasma polishing to a glass part may result in different areas and/or surfaces of a glass part having different amounts of surface roughness. In one embodiment, plasma polishing may be selectively applied in order to achieve a substantially uniform amount or level of surface roughness on a glass part.

Figure 3A:
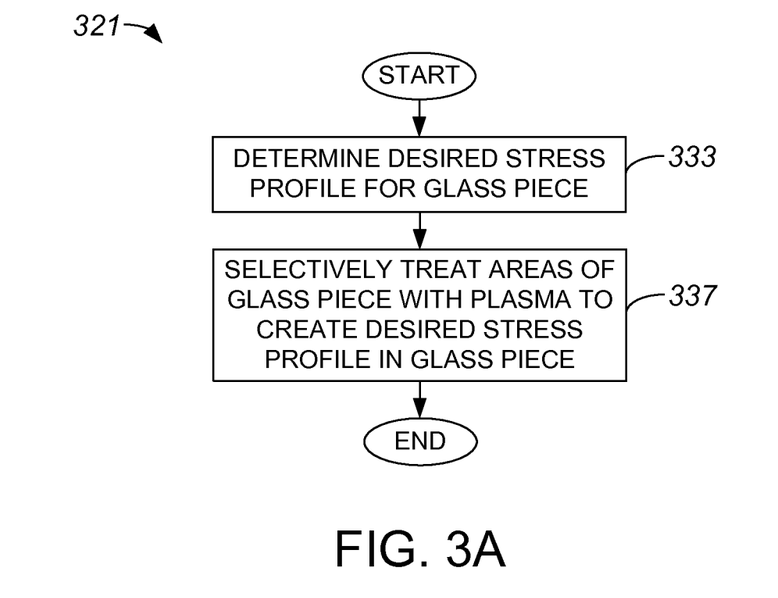
FIG. 3A is a process flow diagram which illustrates a first method of performing plasma polishing on a glass piece in accordance with an embodiment of the present invention.
Figure 3B:
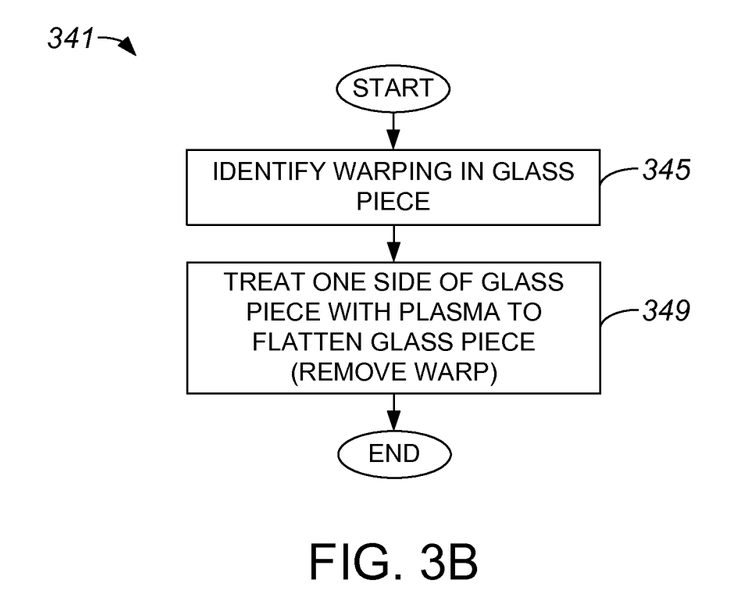
FIG. 3B is a process flow diagram which illustrates a second method of performing plasma polishing on a glass piece in accordance with an embodiment of the present invention.

With reference to FIG. 3A, a method of performing plasma polishing on a glass piece that includes selectively applying plasma polishing to areas of a surface of the glass piece will be described in accordance with an embodiment of the present invention. A method 321 of performing plasma polishing begins at step 333 in which a desired stress profile for a glass piece is determined. A desired stress profile may be determined, for example, using parameters associated with an overall device in which the glass piece is to be included.

Once a desired stress profile for the glass piece is determined, areas of the glass piece may be selectively treated with plasma in step 337 to create the desired stress profile in the glass piece. Creating the desired stress profile may include, but is not limited to including lowering surface roughness associated with the glass piece and/or smoothing sharp edges associated with defects in the glass piece. In one embodiment, selective treatment of areas of a surface of a glass piece may be accomplished by masking the surface with a non-reactive mask prior to introducing plasma to the surface. In such an embodiment, parts of the surface which are covered by the mask will generally not be exposed to the plasma, whereas parts of the surface which are not covered by the mask will be exposed to the plasma and, thus, will be polished. After areas of the glass piece are selectively treated with plasma, the method of performing plasma polishing is completed.

Plasma polishing may be applied to one surface of a glass piece, while the opposite surface of the glass piece is not exposed to plasma polishing. The polishing of one side of a glass piece but not the opposite side may be effective to flatten out a warped glass piece. Referring next to FIG. 3B, a method of performing plasma polishing on a glass piece to compensate for warping while reducing the roughness of a surface will be described in accordance with an embodiment of the present invention. A glass piece may warp or otherwise become misshapen due to excess stress on one side of the glass piece. Warping may occur, for example, when a glass piece is placed in an ion exchange bath as a part of a chemical strengthening process. A method 341 of performing plasma polishing begins at step 345 in which warping in a glass piece is identified. Warping may be identified through any suitable process including, but not limited to including, a non-contact optical inspection of a glass piece or an evaluation of compressive stress on each side of a glass piece.

Once warping is identified in the glass piece, one side of the glass piece is treated in step 349 with plasma to substantially flatten the glass piece. That is, plasma polishing may be substantially applied to one side of the glass piece to reduce stress in the glass piece and, hence, substantially eliminate the warping. It should be appreciated that the application of plasma to one side of the glass piece also reduces the roughness associated with that side of the glass piece. After the glass piece is treated with plasma, the method of performing plasma polishing is completed.

Figure 4:
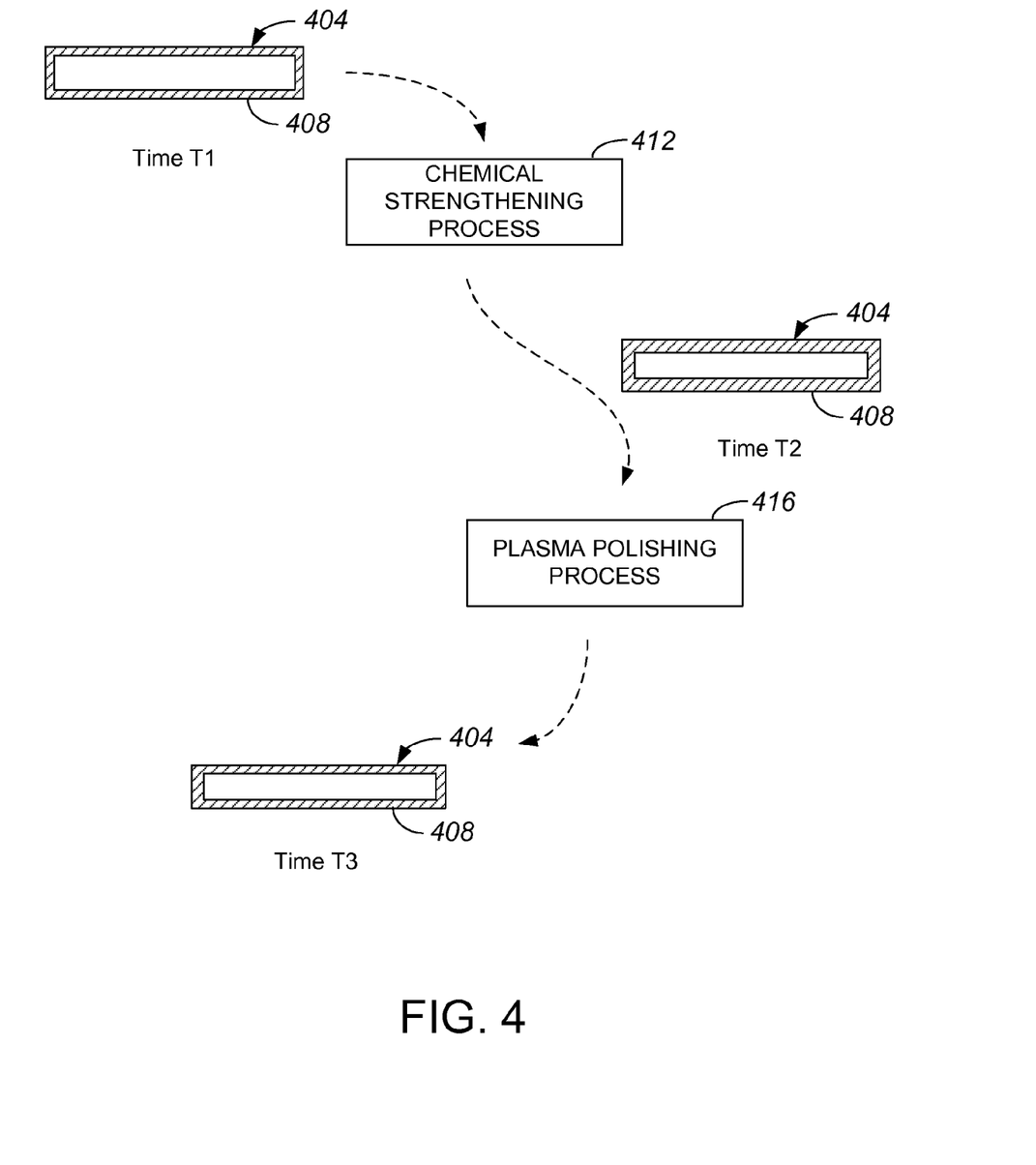
FIG. 4 is a representation of a process that includes chemically strengthening a glass piece and performing plasma polishing on the glass piece in accordance with an embodiment of the present invention.

FIG. 4 is a representation of a process that includes chemically strengthening a glass piece and performing plasma polishing on at least one surface the glass piece in accordance with an embodiment of the present invention. At a time T1, a glass piece or member 404 has surface roughness 408 associated therewith. Surface roughness 408 may be characterized as having a depth with respect to glass piece 404. In one embodiment, surface roughness 408 has a depth of between approximately 0.32 $\mu$m and approximately 0.4 $\mu$m at time T1. Once glass piece 404 is exposed to a chemical strengthening process 412, a depth associated with surface roughness 408 increases. At a time T2, after chemical strengthening process 412 is completed, a depth of surface roughness 408 increases by approximately three hundred percent. For example, a depth of surface roughness 408 may increase from between approximately 0.32 $\mu$m and approximately 0.4 $\mu$m to between approximately 0.9 $\mu$m and approximately 1.2 $\mu$m as a result of chemical strengthening 412.

A plasma polishing process 416 may be applied to glass piece 404 to reduce the depth associated with surface roughness 408. At a time T3, the thickness associated with surface roughness 408 has been reduced as a result of plasma polishing process 416. Plasma polishing process 416 may generally successfully reduce surface roughness 408 by polishing away a thickness of less than approximately five micrometers ($\mu$m) from each surface of glass piece 404. Preferably, at a time T3, smooth, polished surfaces are achieved on glass piece 404 through the removal of less than approximately one micrometer from each surface of glass piece 404 to which plasma polishing process 416 is applied. As mentioned above, in lieu of or in addition to reducing surface roughness, defects in the surface of glass piece 404 may generally be smoothed such that the geometry of the defects is relatively smooth.

Any suitable plasma polishing process may be used to polish the surfaces of a glass piece. Similarly, any suitable plasma polishing apparatus may be used to perform a plasma polishing process. As previously mentioned, suitable plasma polishing processes may include, but are not limited to including, an APPP process, a reactive atom plasma process, a plasma chemical vaporization machining process, and a plasma ion etching process. An APPP process and a reactive atom plasma process generally do not require a vacuum environment and, thus, may be relatively uncomplicated and inexpensive.

In one embodiment, an APPP process is preferred because polishing using an APPP process may be relatively efficient, e.g., polishing may be accomplished in less than approximately five minutes. An APPP process generally utilizes a capacitively-coupled radio frequency plasma torch to generate plasma. As will be appreciated by those skilled in the art, plasma is a gas that has been heated or excited such that electrons begin to dissociate from its atoms, making the plasma electrically conductive and chemically active. Low temperature plasma is a combination of neutral particles, ions that take part in a chemical reaction, and free electrons that provide activation energy. Low temperature plasma may be approximately four orders of magnitude denser than a traditional vacuum plasma. Active radicals contained in low temperature plasma may be approximately two orders of magnitude denser than active radicals in a traditional vacuum plasma.

Figure 5A:
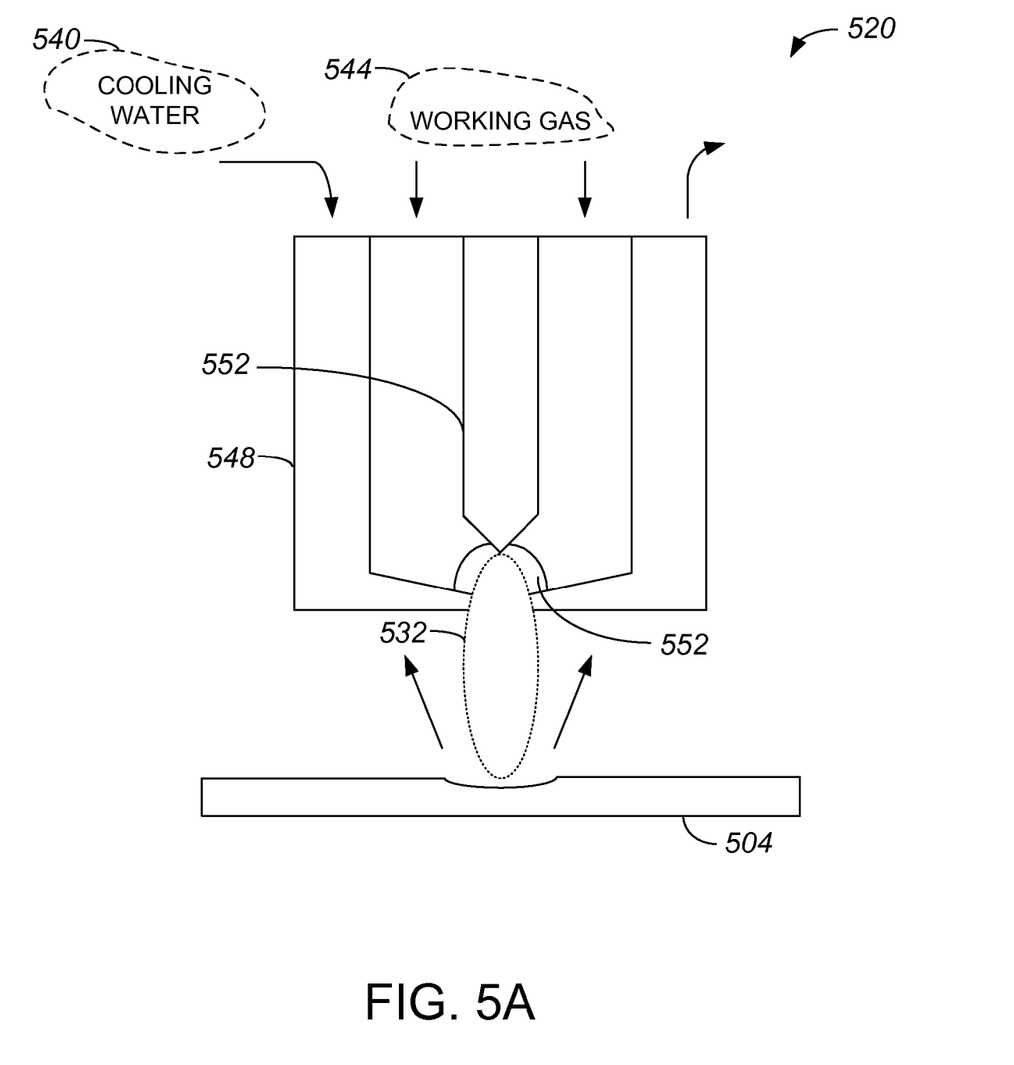
FIG. 5A is a diagrammatic representation of a first plasma torch arranged to perform a plasma polishing process on a substrate, e.g., a glass piece, in accordance with an embodiment of the present invention.

FIG. 5A is a diagrammatic representation of a first plasma torch suitable for use in generating plasma for use in an APPP process in accordance with an embodiment of the present invention. A plasma torch 520 is an axisymmetric, non-transferred plasma torch. An arc 552 is struck between a cathode 552 and an anode 548, and a working gas 544 is heated by passage through an arc region. Cooling water 540 is provided between cathode 552 and anode 548. An arc jet 532 is created that may act on the surface of substrate 504 to remove material and, thus, polish the surface. In one embodiment, fluorine ions in arc jet 532 may bind with silicon molecules in substrate 504 to form silicon tetraflouride. The silicon tetraflouride, as well as other byproducts, may be passively dispersed into the environment.

Figure 5B:
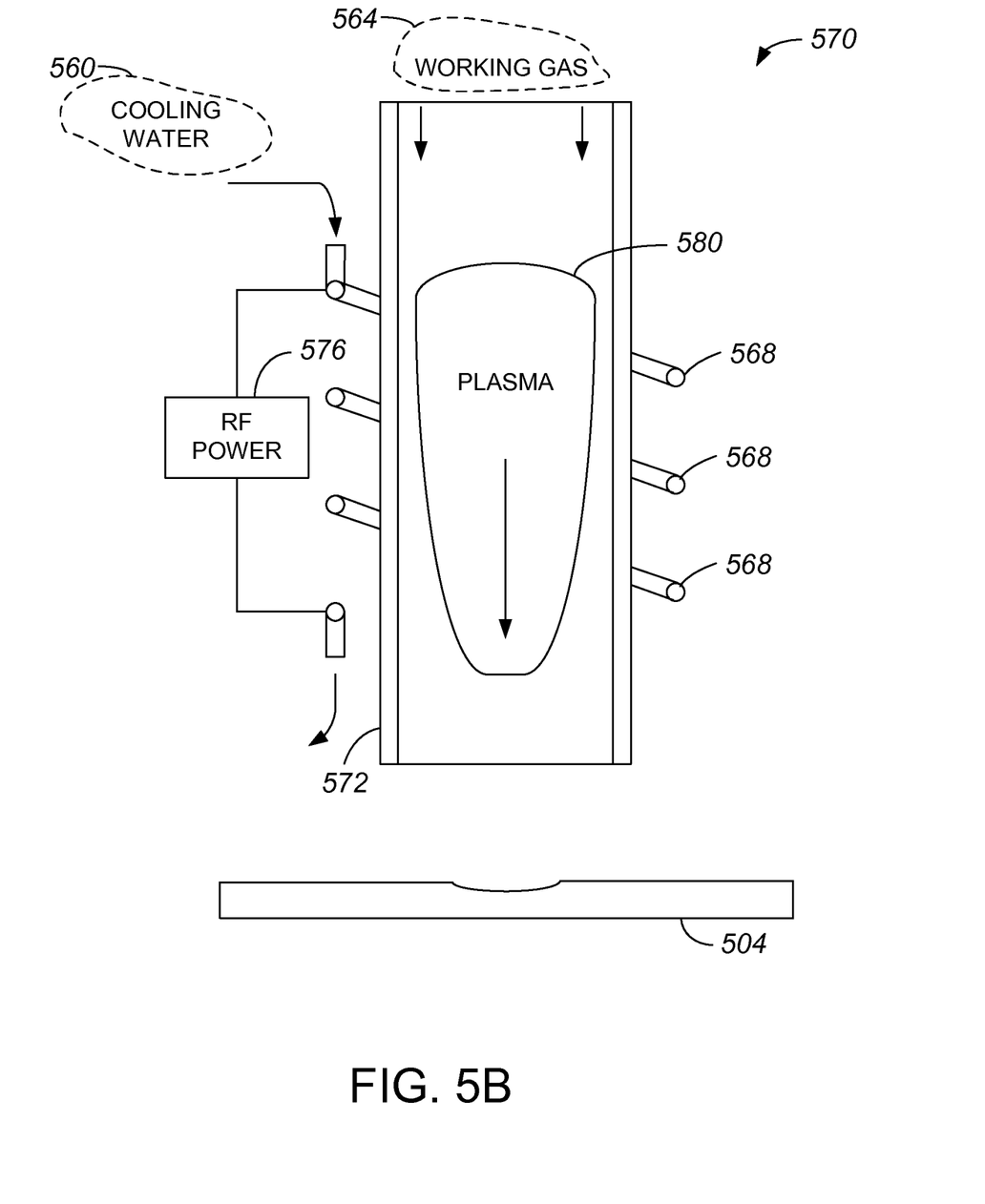
FIG. 5B is a diagrammatic representation of a second plasma torch arranged to perform a plasma polishing process on a substrate, e.g., a glass piece, in accordance with an embodiment of the present invention.

FIG. 5B is a diagrammatic representation of a second plasma torch suitable for use in generating plasma for use in an APPP process in accordance with an embodiment of the present invention. A plasma torch 570 is an inductive coupled radio frequency (RF) plasma torch that includes a quartz tube 572. Plasma 580, which acts to polish a surface of a substrate 504, e.g., a glass substrate, Plasma 580 is substantially started by a high voltage discharge and maintained by RF power 576 applied to a heating coil 568, e.g., an inductive heating coil. Heating coil 568 encloses plasma 580 and effectively forms a tank circuit. In one embodiment, a glass piece polished using a plasma polishing process may be a cover piece or a display screen of an electronic device, e.g., a handheld electronic device.

Figure 6:
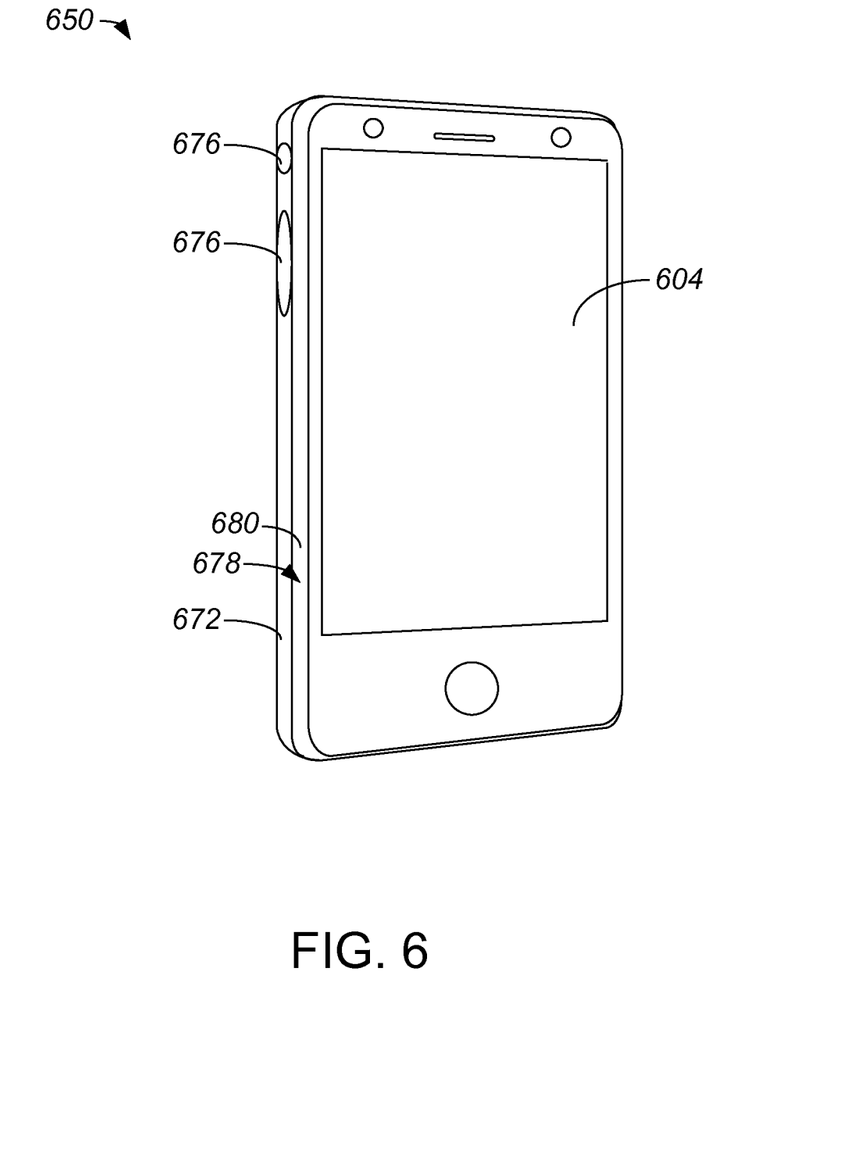
FIG. 6 is a diagrammatic representation of a handheld electronic device.

With reference to FIG. 6, a handheld electronic device will be described in accordance with an embodiment of the present invention. A handheld electronic device 650 may include a housing 672, e.g., a periphery member, that is arranged to at least partially surround the periphery of device 650 to form some or all of the outer-most side, top and bottom surfaces of device 650. Device 650 also includes a cover piece 678 that is arranged to be substantially coupled to housing 672 to effectively enclose an inner volume of device 650. Cover piece 678 may include a glass member 604, e.g., a display screen of device 650, that has been polished using a plasma polishing process. In one embodiment, cover piece 678 includes a bezel or a frame 680 in which glass member 604 is held.

Housing 672 may have any suitable shape, including, for example, one or more elements that may be combined to form a ring. Housing 672 may at least partially enclose an inner volume in which electronic device components may be assembled and retained. The shape of housing 672 may substantially define boundaries of the inner volume, and may be determined based upon the size and type of components placed within the inner volume.

Housing 672 may have any suitable size, and the size may be determined based on any suitable criteria. Suitable criteria may include, but are not limited to including, aesthetics or industrial design, structural considerations, components required for a desired functionality, and/or product design. Housing 672 may have any suitable cross-section, including for example a variable cross-section or a constant cross-section. In some embodiments, the cross-section may be selected based on desired structural properties for housing 672. For example, the cross-section of housing 672 may be substantially rectangular, such that the height of housing 672 is substantially larger than the width of housing 672. Such a cross-sectional shape may provide structural stiffness in compression and tension, as well as in bending. In some embodiments, the dimensions of housing 672 cross-section may be determined relative to the dimensions of the components contained by housing 672.

In some embodiments, housing 672 may include features 676. Features 116 may generally include one or more openings, knobs, extensions, flanges, chamfers, or other features for receiving components or elements of the device. Features 676 of housing 672 extend from any surface of housing 672, including for example from internal surfaces, e.g., to retain internal components or component layers, or from external surfaces. In particular, housing 672 may include a slot or opening (not shown) for receiving a card or tray within device 650. Housing 672 may also include a connector opening (not shown), e.g., for a 30-pin connector, through which a connector may engage one or more conductive pins of device 650. Other features 676 included on housing 672 may include, but are not limited to including, an opening for providing audio to a user, an opening for receiving audio from a user, an opening for an audio connector or power supply, and/or features for retaining and enabling a button such as a volume control or silencing switch.

Although only a few embodiments of the present invention have been described, it should be understood that the present invention may be embodied in many other specific forms without departing from the spirit or the scope of the present invention. By way of example, a plasma polishing process may utilize more than one mask. In one embodiment, different masks may be used in succession to effectively control the amount of polishing that is provided to different areas of the surface of a glass piece. An area of the glass piece that is masked during one stage of polishing but is unmasked during another stage of polishing may be polished less than an area of the glass piece that is never masked, and may be polished more than an area that is masked during both stages of polishing.

Substantially any suitable gas may be used to generate a plasma field. For example, argon may be used to generate plasma. As will be appreciated by those skilled in the art, a secondary gas may be introduced into a plasma field. Such a secondary gas may contain fluorine atoms that may include, but are not limited to including, carbon tetraflouride ($CF_4$) and/or sulphur hexafluoride ($SF_6$). As will be appreciated by those skilled in the art, fluorine atoms may be radicalized in the plasma field such that the fluorine atoms may react with hydrogen in the atmosphere and glass to substantially bread down bonds that effectively hold glass molecules together. In one embodiment, a gas with fluorine may be used to create a chemical reaction between hydrogen and the fluorine. In another embodiment, a gas with hydrogen may instead, or additionally, be used to create a chemical reaction between oxygen and the hydrogen.

Smoothing microscopic features, e.g., defects, in a glass surface generally includes modifying the geometry associated with the features. For instance, when a feature includes a relatively sharp edge, smoothing the feature may effectively smooth the relatively sharp edge. In other words, smoothing a defect may include reducing the sharpness of the defect. As will be appreciated by those skilled in the art, reducing the sharpness of the defect may generally include, but is not limited to including, substantially rounding out an edge associated with the detect.

While the use of a mask to substantially define areas of a surface of a glass piece which are to be polished has been described, other methods may be used to define areas of the surface of a glass piece which are to be polished. In one embodiment, the application of plasma to the surface of a glass piece may be substantially directed at a particular area. By directing the plasma to a particular area, the particular area may be polished while other areas are not polished.

A glass piece may generally be formed using any process of a variety of different processes. In addition, it should be appreciated that a glass piece may be individually formed, and is not limited to being cut from an overall glass sheet. For example, rather than cutting a glass sheet to define a glass piece, a glass piece may be formed using a pot melt process, a fused glass or slumping process, or a float process.

When a glass piece is created using a float process, tin molecules may be infused into a surface of the glass piece. A plasma polishing process may facilitate the removal of the tin molecules. The tin molecules may be removed from a glass piece using the plasma polishing process either before a chemical strengthening process, e.g., before the glass piece is placed in an ion exchange bath, or after the chemical strengthening process.

In one embodiment, coatings such as an anti-reflective coating or an anti-smudge coating may be introduced during a plasma polishing process. That is, rather than applying coatings after a plasma polishing process, the application of coatings may be incorporated into the plasma polishing process.

In general, the steps associated with the methods of the present invention may vary widely. Steps may be added, removed, altered, combined, and reordered without departing from the spirit or the scope of the present invention.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

In one embodiment, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

While embodiments and applications have been shown and described, it would be apparent to those skilled in the art having the benefit of this disclosure that many more modifications than mentioned above are possible without departing from the inventive concepts herein.

What is claimed is:

1. A method for processing a glass member suitable for use in a handheld electronic device, the method comprising:
   obtaining the glass member, the glass member having at least one surface, the at least one surface including a top surface;
   chemically strengthening the glass member, wherein chemically strengthening the glass member increases roughness associated with the at least one surface;
   selectively applying a first non-contact polishing process to a portion of the top surface of the glass member after chemically strengthening the glass member, wherein applying the first non-contact polishing process reduces the roughness associated with selected areas of the at least one surface; and
   polishing non-selected areas of the at least one surface using a second non-contact polishing process,
   wherein a composition of the first non-contact polishing process is different from a composition of the second non-contact polishing process.

2. The method of claim 1 wherein the first non-contact polishing process is a first plasma polishing process.

3. The method of claim 2 wherein applying the first plasma polishing process reduces the roughness associated with the at least one surface by removing a thickness of less than approximately five microns of material from the at least one surface.

4. The method of claim 2 wherein applying the first plasma polishing process reduces the roughness associated with the at least one surface by removing a thickness of less than approximately one micron of material from the at least one surface.

5. The method of claim 2 wherein the first plasma polishing process is one selected from a group including an atmospheric pressure plasma polishing (APPP) process, a reactive atom plasma process, a plasma chemical vaporization machining process, and a plasma ion etching process.

6. The method of claim 2 wherein applying the plasma polishing process to the glass member includes selectively applying the plasma polishing process to specific areas associated with the at least one surface.

7. The method of claim 6 wherein selectively applying the plasma polishing process to the specific areas includes masking at least a portion of the at least one surface.

8. The method of claim 2 further including:
   applying a second plasma polishing process to the glass member before chemically strengthening the glass member.

9. The method of claim 8 wherein applying the second plasma polishing process includes at least one selected from a group including coarse polishing and fine polishing.

10. The method of claim 2 wherein chemically strengthening the glass member includes causing an ion exchange, the ion exchange being associated with ions in the at least one surface.

11. The method of claim 2 further including:
    identifying warping in the glass member, wherein applying the plasma polishing process to the glass member includes removing the warping.

12. The method of claim 1 wherein obtaining the glass member includes obtaining a glass sheet and singulating the glass sheet to create the glass member.

13. The method of claim 1 wherein the glass member is formed from aluminosilicate glass.

14. The method of claim 1 further including:
    identifying warping in the glass member,
    wherein the selectively applying the first non-contact polishing process to the glass member includes removing the warping.

15. The method of claim 1 wherein the selected areas of the at least one surface include at least one defect, the defect having a first geometry, and wherein polishing the selected areas includes smoothing the first geometry.

16. The method of claim 15 wherein the first geometry includes a sharp edge,
    wherein applying the first non-contact polishing process smoothes the sharp edge.

17. The method of claim 1 wherein the second non-contact polishing process a second plasma polishing process.

18. The method of claim 1 wherein the selectively applying a first non-contact polishing process creates a stress profile on the at least one surface.

19. The method of claim 1 wherein the first non-contact polishing process is applied to edges of the glass member.

20. The method of claim 1 further comprising applying at least one coating to the glass member.

21. The method of claim 20 wherein the at least one coating is an ink.

22. The method of claim 20 wherein the at least one coating reduces reflection or smudges.

* * * * *